United States Patent
Wang et al.

(10) Patent No.: US 8,433,434 B2
(45) Date of Patent: Apr. 30, 2013

(54) NEAR NON-ADAPTIVE VIRTUAL METROLOGY AND CHAMBER CONTROL

(75) Inventors: Amy Wang, Taipei (TW); Chen-Hua Yu, Hsin-Chu (TW); Jean Wang, Hsin-Chu (TW); Henry Lo, Hsin-Chu (TW); Francis Ko, Taichung (TW); Chih-Wei Lai, Hsin-Chu (TW); Kewei Zuo, Yonghe (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 411 days.

(21) Appl. No.: 12/766,626

(22) Filed: Apr. 23, 2010

(65) Prior Publication Data

US 2011/0009998 A1    Jan. 13, 2011

Related U.S. Application Data

(60) Provisional application No. 61/224,352, filed on Jul. 9, 2009.

(51) Int. Cl.
*G06F 19/00* (2011.01)

(52) U.S. Cl.
USPC .......................................... 700/110; 700/121

(58) Field of Classification Search .............. 700/97, 700/110, 121
See application file for complete search history.

(56) References Cited

U.S. PATENT DOCUMENTS

| | | | |
|---|---|---|---|
| 5,838,595 A * | 11/1998 | Sullivan et al. | 703/2 |
| 6,988,017 B2 | 1/2006 | Pasadyn et al. | |
| 7,359,759 B2 | 4/2008 | Cheng et al. | |
| 7,505,879 B2 * | 3/2009 | Tomoyasu et al. | 703/2 |
| 2004/0148049 A1 * | 7/2004 | Schwarm | 700/108 |
| 2005/0275848 A1 | 12/2005 | Hill | |
| 2006/0129257 A1 | 6/2006 | Chen et al. | |
| 2008/0003702 A1 * | 1/2008 | Cruse et al. | 438/7 |
| 2008/0133163 A1 | 6/2008 | Shanmugasundram et al. | |
| 2008/0275586 A1 | 11/2008 | Ko et al. | |
| 2008/0275676 A1 * | 11/2008 | Lin et al. | 703/2 |
| 2009/0000950 A1 * | 1/2009 | Ortleb et al. | 205/84 |

OTHER PUBLICATIONS

Su, A-J, et al., "Control relevant issues in semiconductor manufacturing: Overview with some new results," Control Engineering Practice 15, 2007, pp. 1268-1279.

Khan, et al., "Fab-wide virtual metrology and feedback control," NFS Engineering Research Center for Reconfigurable Manufacturing Systems, Asian AEC/APC Symposium, 2006, pp. 1-26.

Zeng, D., "Utilization of Real-Time Data for Virtual Meterology Modeling," M.S. Report, Department of Electrical Engeering and Computer Sciences, pp. 1-90, May 12, 2008.

(Continued)

*Primary Examiner* — Ryan Jarrett

(74) *Attorney, Agent, or Firm* — Slater & Matsil, L.L.P.

(57) ABSTRACT

Embodiments of the present invention relate to a method for a near non-adaptive virtual metrology for wafer processing control. In accordance with an embodiment of the present invention, a method for processing control comprises diagnosing a chamber of a processing tool that processes a wafer to identify a key chamber parameter, and controlling the chamber based on the key chamber parameter if the key chamber parameter can be controlled, or compensating a prediction model by changing to a secondary prediction model if the key chamber parameter cannot be sufficiently controlled.

20 Claims, 3 Drawing Sheets

OTHER PUBLICATIONS

Mouli, C., et al., "Adaptive Metrology Sampling techniques enabling higher precision in variability detection and control," SEMI Advanced Semiconductor Manufacturing Conference, IEEE, 2007, pp. 12-17.

Chen, P.H., et al., "Virtual Metrology: A Solution for Wafer to Wafer Advanced Process Control," IEEE, 2005, pp. 155-157.

Sonderman, T., et al., "Advanced Process Control in Semiconductor Manufacturing," downloaded Jan. 5, 2009, 71 pages.

Khan, A.A., et al., "Virtual metrology and feedback control for semiconductor manufacturing process using recursive partial least squares," Journal of Process Control 18, 2008, pp. 961-974.

* cited by examiner

NEAR NON-ADAPTIVE VIRTUAL METROLOGY AND CHAMBER CONTROL

This application claims the benefit of U.S. Provisional Patent Application Ser. No. 61/224,352, filed on Jul. 9, 2009, and entitled "Near Non-Adaptive Virtual Metrology and Chamber Control," which application is incorporated herein by reference.

TECHNICAL FIELD

The present invention relates generally to a method for semiconductor wafer processing control, and more particularly to a method for a near non-adaptive virtual metrology for wafer processing control.

BACKGROUND

Generally, in semiconductor processing, metrology is the measuring of dimensions and characteristics of a semiconductor wafer after processing. Virtual metrology (VM) typically uses a model to predict the resulting dimensions and characteristics of a wafer based on parameters from the processing chamber.

Adaptive VM generally requires building a model based on metrology results from two or three wafers of a lot of wafers and chamber parameters for each tool. This model is then used to predict the outcome of the processing of the wafers of the following lot. Because the control is adjusted on a per lot basis, the control is considered to be lot-to-lot (LtL) control.

However, metrology results for the two or three wafers generally takes between a few hours and half a day to receive from the metrology tools. This delay is typically impracticable for current manufacturing needs. Ideally, VM could be used to control processing on a wafer-to-wafer (WtW) basis to gain higher precision and accuracy were it not for the delay in obtaining metrology results. Also, the conventional methods generally cannot accomplish WtW control because the sampling rate is limited. Further, adaptive VM is not able to identify and correct chamber drift. Thus, conventional adaptive VM methods cannot realize WtW control or correction of chamber drift. Accordingly, there is a need in the art for a method to overcome the above described shortcomings.

SUMMARY OF THE INVENTION

These and other problems are generally solved or circumvented, and technical advantages are generally achieved, by embodiments of the present invention.

In accordance with an embodiment of the present invention, a method for processing control comprises diagnosing a chamber of a processing tool that processes a wafer to identify a key chamber parameter, and controlling the chamber based on the key chamber parameter if the key chamber parameter can be controlled, or compensating a prediction model by changing to a secondary prediction model if the key chamber parameter cannot be sufficiently controlled.

In accordance with another embodiment of the present invention, a method for controlling a process tool comprises predicting a result of a wafer processed by the chamber and using correlation to determine a coefficient of correlation for a chamber parameter data set to a residual data set. The chamber parameter data set comprises chamber data-points each relating to either one of historical wafers or the wafer, and the residual data set comprises error data-points each relating to either one of the historical wafers or the wafer. The method further comprises defining a stable range based on each of the error data-points that meets a target, defining an unstable range based on each of the error data-points that does not meet the target, analyzing a difference between the chamber parameter stable range and the chamber parameter unstable range, and identifying the key chamber parameter if the difference between the chamber parameter stable range and the chamber parameter unstable range is within a second limit, all done when the coefficient of correlation is within a first limit. The method also comprises controlling the chamber based on the key chamber parameter or compensating a prediction model by changing to a secondary prediction model.

In accordance with yet another embodiment of the present invention, a method for correcting chamber drift comprises correlating a chamber parameter data set to a residual data set to obtain a coefficient of correlation and identifying a non-key chamber parameter if the coefficient of determination is less than a first limit. The chamber parameter data set comprises chamber data points each relating to either one of historical wafers or the wafer, and the residual data set comprises error data points each relating to either one of the historical wafers or the wafer. The method further comprises defining a chamber parameter stable range based on a first set of error data points that are within a target range, defining a chamber parameter unstable range based on a second set of error data points that are not within the target range, analyzing a difference between the chamber parameter stable range and the chamber parameter unstable range, identifying the key chamber parameter if the difference between the chamber parameter stable range and the chamber parameter unstable range is within a second limit, and controlling the chamber based on the key chamber parameter if the key chamber parameter is not passive or compensating a prediction model by changing to a secondary prediction model if the key chamber parameter is passive.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a near non-adaptive virtual metrology method with chamber control. The invention may also be applied, however, to other processing control methods, such as adaptive virtual metrology.

Figure 1:
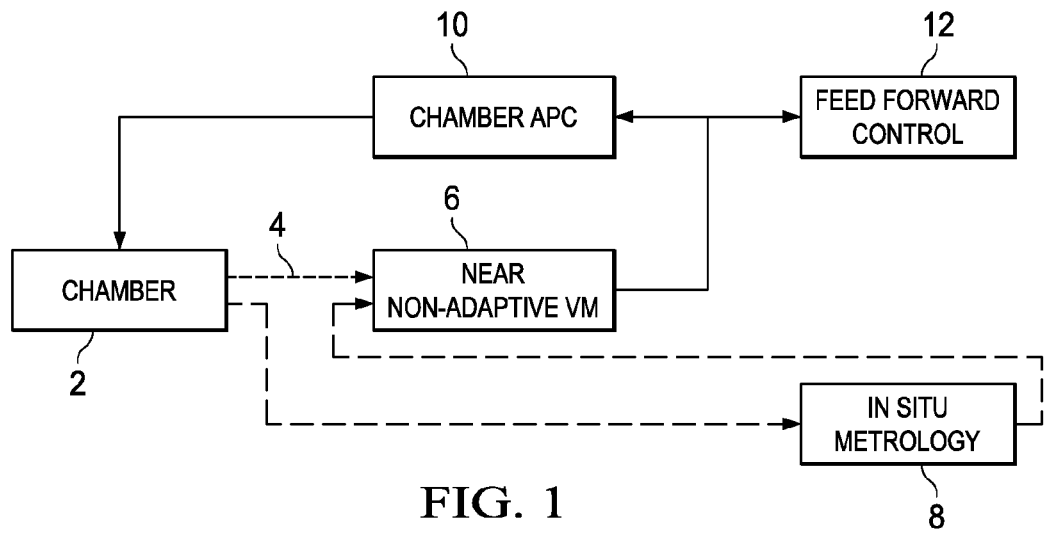
FIG. 1 is a process employing near non-adaptive VM in accordance with an embodiment of the present invention.

FIG. 1 illustrates a process employing near non-adaptive VM in accordance with an embodiment of the invention. A chamber of a processing tool 2 performs some processing steps, for example etching polysilicon on the wafer. Sensors on the chamber send chamber parameters 4 to the near non-adaptive VM module 6. The number of chamber parameters will vary depending on the processing tool and the process. For example, a polysilicon etching process may comprise approximately one thousand parameters, and a simple etch may comprise approximately one hundred parameters. Example parameters for a simple etching process are optical emission spectroscopy (OES), radio frequency (RF) power, and the like. In situ metrology tools then take measurements of the wafer while in the chamber 8. The near non-adaptive VM application 6 then is able to determine key, or important, chamber parameters, as discussed in detail below, and uses chamber automatic process control (APC) 10 to control those key chamber parameters, i.e. feed-back control, and/or switches to a more appropriate prediction model. Further, the near non-adaptive VM application can control subsequent processing tools, i.e. feed-forward control 12.

Figure 2:
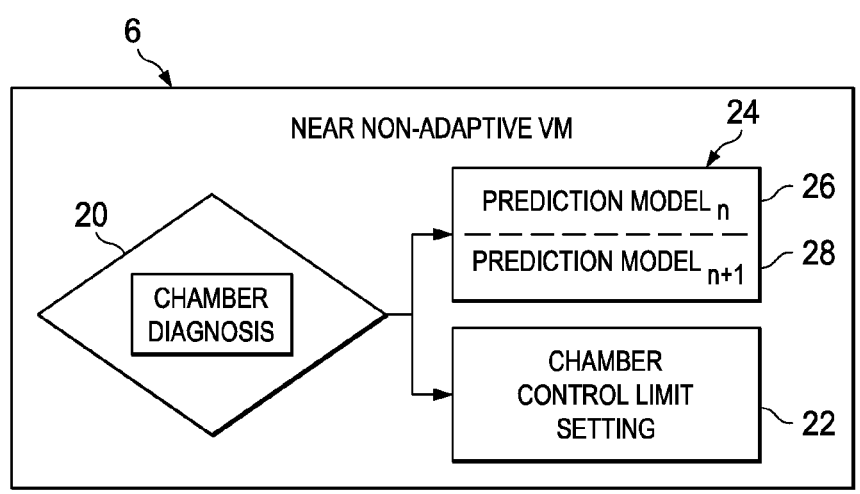
FIG. 2 is a near non-adaptive VM module in accordance with an embodiment of the present invention.

FIG. 2 illustrates the near non-adaptive VM module 6 in accordance with an embodiment. A chamber diagnosis module 20 uses the chamber parameters 4 and prediction errors to identify key chamber parameters. Once the key chamber parameters are identified, the near non-adaptive VM module 6 uses chamber control limit setting module 22 to determine the appropriate action necessary to control the chamber for subsequent processing of wafers. However, if a particular key chamber parameter is passive only and cannot be controlled, such as optical emission sensors (OES), the near non-adaptive VM module 6 will run a switch prediction module 24 to determine an appropriate model for the key chamber parameter condition. FIG. 2 illustrates two prediction models, Prediction Model$_n$ 26 and Prediction Model$_{n+1}$ 28, however, more models may be used for a single passive chamber parameter. Further, a chamber is likely to have multiple passive parameters.

Figure 3:
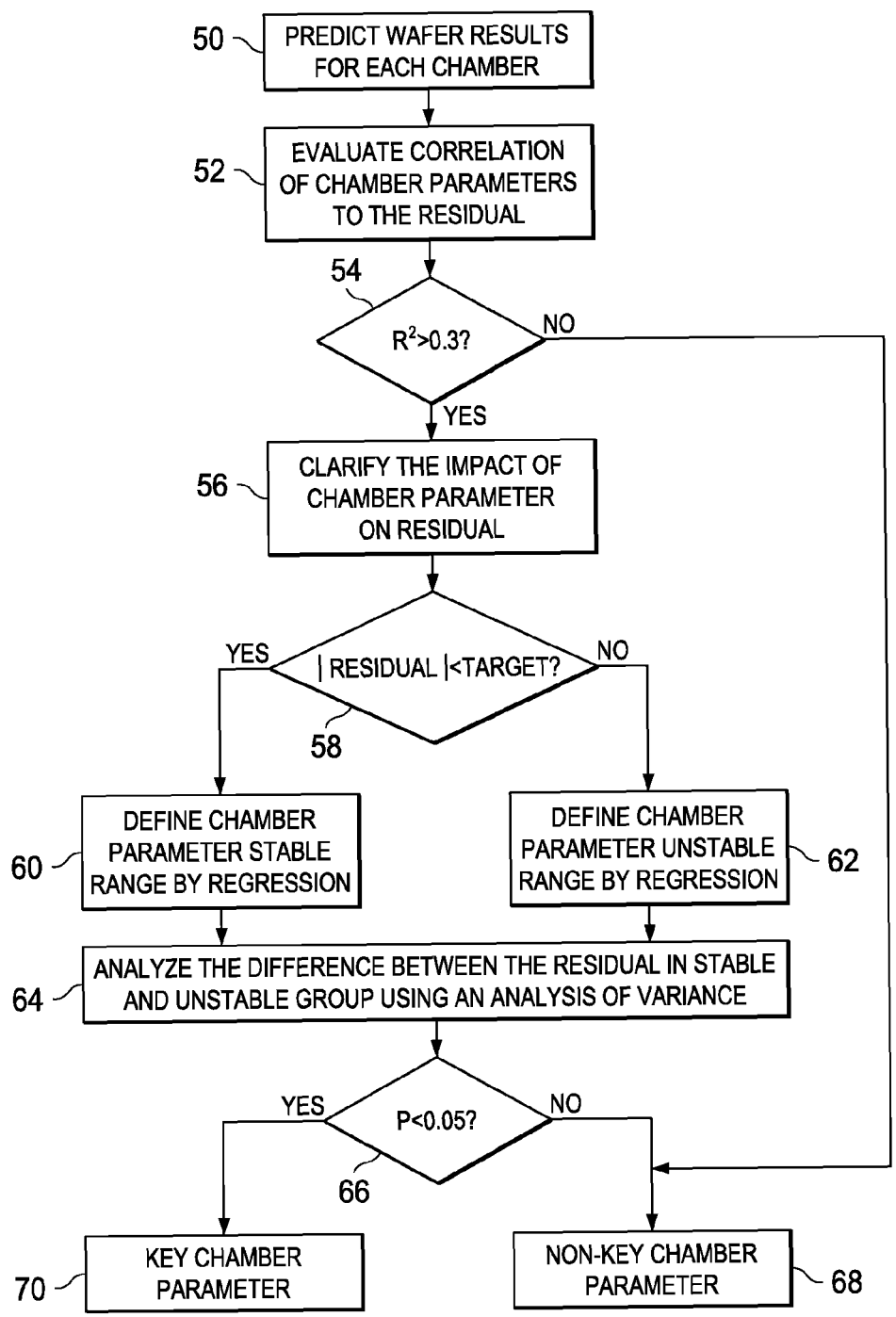
FIG. 3 is a flowchart of a chamber diagnosis module in accordance with an embodiment of the present invention.

FIG. 3 illustrates a flowchart of the chamber diagnosis module 20 in accordance with an embodiment. The chamber diagnosis module 20 is essentially a statistical analysis of each chamber parameter. First, the wafer result of a currently processed wafer in a chamber is predicted 50. The predicted wafer result comprises predicted measurement results of the currently processed wafer. Then, a residual is determined for the wafer. The residual is the error of the prediction. The error is the difference of the predicted results from the in situ metrology results received by the module after processing the wafer in the chamber.

Further, information from historical, or previously processed, wafers is used during this statistical analysis. This information comprises the predicted wafer result, the residual, and the value or indication of each chamber parameter for each historical wafer. For simplicity and clarity, this information can be organized into data sets. For example, a residual data set comprises the residual of the currently processed wafer and each historical wafer. Further, a first chamber parameter data set may comprise the value or indication of a first chamber parameter for the currently processed wafer and each historical wafer, and likewise for a second chamber parameter data set, and so on. Embodiments contemplate that any number of historical wafers and corresponding information may be used in this process.

Next, the correlation of the residual data set to each chamber parameter data set is then evaluated 52. If the coefficient of determination, $R^2$, for a particular chamber parameter is less than or equal to a first threshold, such as 0.3 in this example 54, then the relationship between the chamber parameter data set and the residual data set is considered to be weak, and the chamber parameter is not a key chamber parameter 68. In other embodiments, if $R^2$ is less than or equal to 0.5, the particular chamber parameter is not a key chamber parameter. Otherwise, the impact of the parameter on the residual must be clarified 56.

Figure 4:
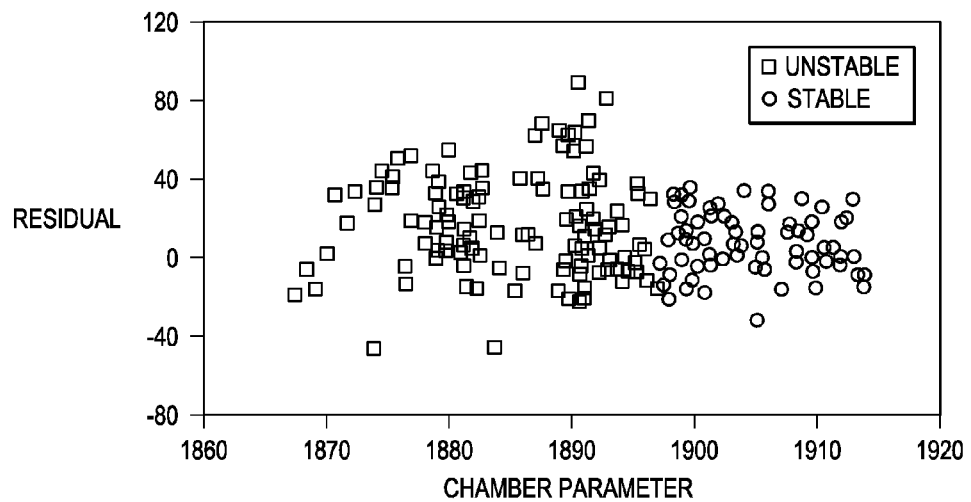
FIG. 4 is an example of stable and unstable data-points determined by an embodiment of the present invention.

Then, the absolute value of each datum of the residual data set is compared to a target 58. The target is determined on a case-by-case basis depending partly on the chamber or processing. In some embodiments, the target is between approximately twenty and thirty percent of the allowable process variation; however, other targets are not excluded. If the absolute value of a datum of the residual data set is less than the target, the datum is considered to be unstable, and the chamber parameter unstable range is defined by regression based on all unstable data in the residual data set to find a linear expression of the range 60. Otherwise, if the datum of the residual data set is not less than the target, the datum is considered to be stable, and the chamber parameter stable range is defined by regression based on all stable data in the residual data set to find a linear expression of the range 62. An example of stable and unstable data of the residual data set is illustrated in FIG. 4. FIG. 4 shows the key chamber parameter range on the x-axis and the residual range on the y-axis. The stable range is bounded by the range of approximately 1900 to 1915 on the x-axis and the range of approximately −40 to 40 on the y-axis.

Figure 5:
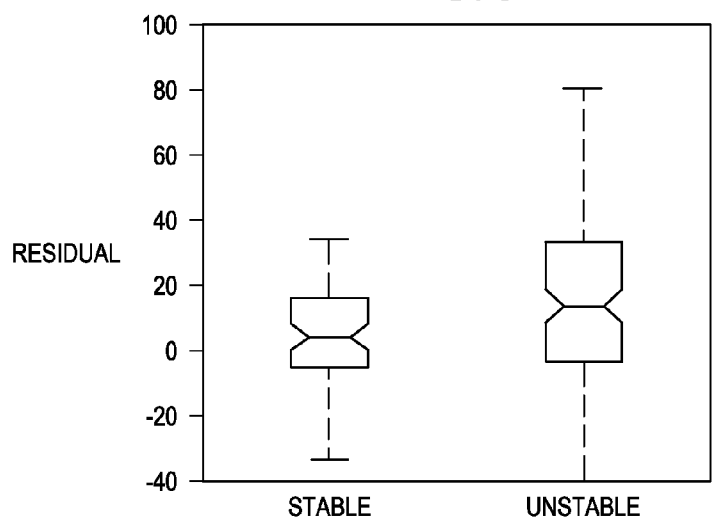
FIG. 5 is a defined stable and unstable range for a chamber parameter as determined by an embodiment of the present invention.

Next, referring back to FIG. 3, the difference between the chamber parameter stable range and unstable range is analyzed using an analysis of variance (ANOVA) 64. From this analysis, if the p-value, is less than a second threshold, such as 0.05 in this example 66, then the chamber parameter is considered a key parameter 70, or in other words, the effect of the parameter on the mean of the residual is statistically significant. Otherwise, the parameter is a non-key parameter 68. The p-value is a value for the null hypothesis assuming all samples are from the same population, or from different populations with the same mean. If the p-value is near zero, this casts doubt on the null hypothesis and suggests that at least one sample mean is significantly different from the other sample means. In other embodiments, the p-value may be other values, such as 0.01. FIG. 5 shows a defined stable and unstable range for a chamber parameter. The variance for each range is shown by the dashed lines. As can be seen, the stable range is much smaller than the unstable range, as is the variance.

In this embodiment, a prediction model would need to be built, at most, on a day-to-day frequency, or less frequently, rather than on a lot-to-lot basis. By utilizing this method, advantages over the prior art may be realized. This allows real time WtW control feasibility without limitation on metrology measurement data feedback rate. Further, the chamber condition is detected and controlled typically causing greater prediction accuracy. Any chamber drift or aging or chamber behavior shift as a result of a periodic maintenance (PM) event may be compensated by controlling the chamber conditions or compensating or switching the prediction models. For example, the method may allow for forty percent improvement in the prediction of a trench depth etching process and for ten percent improvement in the prediction of a polysilicon critical dimension (CD) etching process. Next, the method allows for the realization of virtual wafer acceptance testing (VWAT) and not only single process prediction. VWAT may be realized by predicting the final processing results of each wafer while each wafer is still being processed, even in early processing steps.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing control, the method comprising:
    diagnosing a chamber of a processing tool that processes a wafer to identify a key chamber parameter, the diagnosing using a predicted result of the wafer, wherein the diagnosing the chamber comprises:
    predicting the result of the wafer;
    correlating a chamber parameter data set to a residual data set to obtain a coefficient of correlation for the chamber parameter, wherein the chamber parameter data set comprises chamber data points each relating to either one of historical wafers or the wafer, and wherein the residual data set comprises error data points each relating to either one of the historical wafers or the wafer;
    identifying a non-key chamber parameter if a coefficient of correlation is less than a first limit;
    defining a chamber parameter stable range based on each of the error data points that has an absolute value less than a target;
    defining a chamber parameter unstable range based on each of the error data points that has an absolute value equal to or greater than the target;
    analyzing a difference between the chamber parameter stable range and the chamber parameter unstable range; and
    identifying the key chamber parameter if the difference between the chamber parameter stable range and the chamber parameter unstable range is within a second limit; and
    controlling the chamber based on the key chamber parameter if the key chamber parameter can be controlled, or compensating a prediction model by changing to a secondary prediction model if the key chamber parameter is passive.

2. The method of claim 1, further comprising controlling a subsequent chamber of a subsequent processing tool.

3. The method of claim 1, wherein the step of the controlling or compensating comprises the compensating the prediction model by changing to a secondary model, wherein the changing to a secondary prediction model comprises selecting the secondary prediction model from a plurality of possible prediction models.

4. The method of claim 1, wherein the diagnosing the chamber comprises a statistical analysis of a plurality of chamber parameters to determine which of the plurality of chamber parameters most closely corresponds to a variation of the chamber processing.

5. The method of claim 1, wherein the first limit is 0.3.

6. The method of claim 1, wherein the first limit is 0.5.

7. The method of claim 1, wherein the target is defined in part by the processing tool.

8. The method of claim 1, wherein the target is between twenty and thirty percent of an allowable process variation.

9. The method of claim 1, wherein the defining the chamber parameter stable range and the defining the chamber parameter unstable range each includes using regression analysis.

10. The method of claim 1, wherein the analyzing the difference includes using an analysis of variance.

11. The method of claim 10, wherein the key parameter is identified if a p-value produced by the analysis of variance is less than 0.05.

12. A method for controlling a process tool, the method comprising:
    predicting a result of a wafer processed by a chamber;
    using correlation to determine a coefficient of correlation for a chamber parameter data set to a residual data set, wherein the chamber parameter data set comprises chamber data-points each relating to either one of historical wafers or the wafer, and wherein the residual data set comprises error data-points each relating to either one of the historical wafers or the wafer;
    when the coefficient of correlation is within a first limit:
        defining a chamber parameter stable range based on each of the error data-points that meets a target;
        defining a chamber parameter unstable range based on each of the error data-points that does not meet the target;
        analyzing a difference between the chamber parameter stable range and the chamber parameter unstable range;
        identifying a key chamber parameter if the difference between the chamber parameter stable range and the chamber parameter unstable range is within a second limit; and
    controlling the chamber based on the key chamber parameter or compensating a prediction model by changing to a secondary prediction model.

13. The method of claim 12, wherein the coefficient of correlation is within the first limit when the coefficient of correlation is greater than 0.3.

14. The method of claim 12, wherein one error data-point meets the target when an absolute value of the one error data-point is less than an allowable process variation, and wherein another error data-point does not meet the target when the absolute value of the another error data-point is greater than or equal to the allowable process variation.

15. The method of claim 12, wherein the analyzing the difference comprises using an analysis of variance, and wherein the identifying the key chamber parameter if the difference is within the second limit comprises identifying the key chamber parameter if a p-value is less than 0.05.

16. A method for correcting chamber drift, the method comprising:
    correlating a chamber parameter data set to a residual data set to obtain a coefficient of correlation, wherein the chamber parameter data set comprises chamber data points each relating to either one of historical wafers or the wafer, and wherein the residual data set comprises error data points each relating to either one of the historical wafers or the wafer;

identifying a non-key chamber parameter if a coefficient of determination is less than a first limit;
defining a chamber parameter stable range based on a first set of error data points that are within a target range;
defining a chamber parameter unstable range based on a second set of error data points that are not within the target range;
analyzing a difference between the chamber parameter stable range and the chamber parameter unstable range;
identifying the key chamber parameter if the difference between the chamber parameter stable range and the chamber parameter unstable range is within a second limit; and
controlling the chamber based on the key chamber parameter if the key chamber parameter is not passive or compensating a prediction model by changing to a secondary prediction model if the key chamber parameter is passive.

17. The method of claim 16, further comprising identifying a non-key chamber parameter if the difference between the chamber parameter stable range and the chamber parameter unstable range is not within the limit.

18. The method of claim 16, wherein the defining the chamber parameter stable range and the defining the chamber parameter unstable range each comprises using regression analysis.

19. The method of claim 16, wherein the analyzing the difference comprises using an analysis of variance.

20. The method of claim 19, wherein the second limit comprises a p-value that is less than 0.05.

* * * * *